US012492105B2

(12) United States Patent
Ou et al.

(10) Patent No.: US 12,492,105 B2
(45) Date of Patent: Dec. 9, 2025

(54) METHOD AND APPARATUS FOR STOPPING DEVICE, AND CRANE, ELECTRONIC DEVICE AND READABLE MEDIUM

(71) Applicant: Zoomlion Heavy Industry Science and Technology Co., Ltd., Changsha (CN)

(72) Inventors: Biao Ou, Changsha (CN); Ling Fu, Changsha (CN); Xiaoying Yu, Changsha (CN); Yanbin Liu, Changsha (CN); Wenkun Long, Changsha (CN); Qiang He, Changsha (CN); Li Yin, Changsha (CN)

(73) Assignee: ZOOMLION HEAVY INDUSTRY SCIENCE AND TECHNOLOGY CO., LTD., Hunan (CN)

( * ) Notice: Subject to any disclaimer, the term of this patent is extended or adjusted under 35 U.S.C. 154(b) by 267 days.

(21) Appl. No.: 18/552,498

(22) PCT Filed: Apr. 1, 2022

(86) PCT No.: PCT/CN2022/084802
§ 371 (c)(1),
(2) Date: Nov. 3, 2023

(87) PCT Pub. No.: WO2022/206952
PCT Pub. Date: Oct. 6, 2022

(65) Prior Publication Data

US 2024/0182276 A1 Jun. 6, 2024

(30) Foreign Application Priority Data

Apr. 1, 2021 (CN) ......................... 202110357890.1

(51) Int. Cl.
*B66D 1/00* (2006.01)
*B66C 13/22* (2006.01)
*B66D 1/40* (2006.01)

(52) U.S. Cl.
CPC ................ *B66D 1/40* (2013.01); *B66C 13/22* (2013.01); *B66C 2700/08* (2013.01); *B66D 2700/02* (2013.01)

(58) Field of Classification Search
CPC ........ B66D 1/40; B66D 2700/02; B66D 1/46; B66D 5/28; B66C 13/22; B66C 2700/08; B66C 13/26; F15B 21/02; F15B 21/085
See application file for complete search history.

(56) References Cited

U.S. PATENT DOCUMENTS

2011/0006024 A1* 1/2011 Schneider ............... B66C 13/06 212/272
2020/0148510 A1* 5/2020 Rauscher .............. B66C 13/063
2022/0194749 A1* 6/2022 Englert ................. B66C 13/063

FOREIGN PATENT DOCUMENTS

CN 101439828 A 5/2009
CN 202029833 U 11/2011
(Continued)

OTHER PUBLICATIONS

Wu, Yue-ming, et al., "Application of Continuously Viable in Cranes with the Encoder," J. of Anhui University of Technology (Natural Science), Oct. 2020, vol. 27, No. 4, 4 pgs.

*Primary Examiner* — Russell Frejd
*Assistant Examiner* — Brittany Renee Peko
(74) *Attorney, Agent, or Firm* — Volpe Koenig

(57) ABSTRACT

The present application relates to a stopping method and apparatus for a device with a hoisting mechanism and a crane. The method includes: generating a displacement change rate according to position offset information of a hoisting handle of the device when the position offset information meets a triggering condition; comparing the displacement change rate with a preset threshold to generate a stopping control instruction; and controlling an overhead system of the device to perform deceleration stopping
(Continued)

20 according to the stopping control instruction. The stopping method and apparatus for the device with the hoisting mechanism, the crane, the electronic device and the computer readable medium involved in the present application may achieve the purpose of rapid stopping control only through the hoisting handle of the device, and reduce the requirement for the driver's reaction time and increase the safety of the device when emergency stopping is required.

19 Claims, 11 Drawing Sheets

(56) References Cited

FOREIGN PATENT DOCUMENTS

| | | | | | |
|---|---|---|---|---|---|
| CN | 103010963 | A | | 4/2013 | |
| CN | 103613040 | A | | 3/2014 | |
| CN | 103738853 | A1 | * | 4/2014 | ............ B66C 13/18 |
| CN | 105332963 | A | * | 2/2016 | ............. F15B 13/02 |
| CN | 106516986 | A | | 3/2017 | |
| CN | 206900468 | U | | 1/2018 | |
| CN | 108025707 | A | | 5/2018 | |
| CN | 111267612 | A | | 6/2020 | |
| CN | 111424638 | A | | 7/2020 | |
| CN | 113023612 | A | | 6/2021 | |
| DE | 3612247 | A1 | | 10/1987 | |
| JP | 10-203778 | A | | 8/1998 | |
| JP | 10236769 | A | | 9/1998 | |
| WO | 2017/209269 | A1 | | 12/2017 | |

* cited by examiner

METHOD AND APPARATUS FOR STOPPING DEVICE, AND CRANE, ELECTRONIC DEVICE AND READABLE MEDIUM

CROSS REFERENCE TO RELATED APPLICATIONS

The present application claims priority to Chinese patent application No. 202110357890.1, filed on Apr. 1, 2021, and the content of which is incorporated herein by reference.

FIELD OF THE INVENTION

The present application relates to the field of crane control, in particular to a stopping method and apparatus for a device with a hoisting mechanism, a crane, an electronic device and a computer readable medium.

BACKGROUND OF THE INVENTION

A device for controlling a hoisting mechanism through a handle to lift an object may include an automobile crane, a tower crane, a portal crane, a rotary drilling rig, etc., which are an indispensable category of important products in the field of engineering machinery, and because of their flexible mode of operation, simple and efficient operation, they are widely used in infrastructure, rescue, urban construction and other industries.

Without loss of generality, taking a crane as an example, a hoisting speed of the crane is affected by an opening degree of a hoisting handle operated by a driver, the larger the opening degree of the hoisting handle, the higher the hoisting speed, and the less the opening degree of the hoisting handle, the lower the speed. When the driver operates the hoisting handle to a middle position, the hoisting speed is reduced to zero, and a hoisting brake is put in during deceleration to prevent heavy objects from slipping. When the driver quickly releases the operation of the hoisting handle, the hoisting mechanism is rapidly decelerated to zero, the brake is quickly put in and locks power transmission, and the brake is put in too early to decelerate, which will cause shaking or strong impact of the mechanism. The deceleration process of the crane requires an operator to reasonably grasp the deceleration time of the crane, so as to avoid long-term impact damage on the crane.

In an existing crane brake control method, the driver needs to realize emergency stopping of the crane through an emergency stopping button. During emergency stopping, after a controller receives an emergency stopping button signal, the brake is directly put into use to achieve rapid stopping. In this way, the driver cannot control the deceleration time through the operation handle, and must press a specific emergency stopping button to perform stopping, and this stopping way requires a high response speed of the driver. Moreover, in order to achieve the purpose of rapid stopping, the controller on the crane does not judge the running speed of a motor when the brake is put in, and directly performs brake operation, and this way is also prone to causing severe braking impact, which may lead to serious accidents such as crane rollover and boom break.

Therefore, a new stopping method and apparatus for a device with a hoisting mechanism, a crane, an electronic device and a computer readable medium are needed.

The above information disclosed in the background technology section is used only to enhance the understanding of the background to the present application, so it may include information that does not constitute prior art known to those ordinarily skilled in the art.

SUMMARY OF THE INVENTION

In view of this, the present application provides a stopping method and apparatus for a device with a hoisting mechanism, a crane, an electronic device and a computer readable medium, which can achieve the purpose of rapid stopping control only through a hoisting handle of the device, and reduce the requirement for the driver's reaction time and increase the safety of the device when emergency stopping is required.

Other features and advantages of the present application will become apparent through detailed descriptions below, or will be learned in part through the practice of the present application.

According to one aspect of the present application, a stopping method for a device with a hoisting mechanism is proposed and includes: acquiring position offset information of a hoisting handle of the device in real time; generating a displacement change rate according to the position offset information when the position offset information meets a triggering condition; comparing the displacement change rate with a preset threshold to generate a stopping control instruction; and controlling an overhead system of the device to perform deceleration stopping according to the stopping control instruction.

In an embodiment of the present application, further comprises: generating the preset threshold based on a relationship between motor torque characteristics of the device and a displacement change rate of the hoisting handle.

In an embodiment of the present application, wherein the preset threshold comprises a first threshold and a second threshold; and generating the preset threshold based on the relationship between the motor torque characteristics of the device and the displacement change rate of the hoisting handle comprises: generating the first threshold according to a displacement change rate of a motor of the device following a speed of the hoisting handle under a normal state; and generating the second threshold according to the displacement change rate of the hoisting handle during automatic return.

In an embodiment of the present application, wherein acquiring the position offset information of the hoisting handle of the device in real time comprises: acquiring the position offset information through a displacement sensor set on the hoisting handle of the device.

In an embodiment of the present application, wherein generating the displacement change rate according to the position offset information comprises: acquiring a plurality of position offset information; and generating the displacement change rate according to the plurality of position offset information.

In an embodiment of the present application, wherein acquiring the plurality of position offset information comprises: acquiring a plurality of frames of signals of the displacement sensor through a CAN to generate the plurality of position offset information.

In an embodiment of the present application, wherein generating the displacement change rate according to the plurality of position offset information comprises: fitting the plurality of position offset information based on a least square method to generate the displacement change rate.

In an embodiment of the present application, wherein comparing the displacement change rate with the preset threshold to generate the stopping control instruction comprises: generating a normal stopping control instruction in a case that the displacement change rate is less than or equal to the first threshold; generating a handle throwing stopping control instruction in a case that the displacement change rate is greater than the first threshold and less than the second threshold; and generating a rapid stopping control instruction in a case that the displacement change rate is greater than or equal to the second threshold.

In an embodiment of the present application, wherein controlling the overhead system of the device to perform deceleration stopping according to the stopping control instruction comprises: generating a target speed curve based on the position offset information under the normal stopping control instruction; generating a target speed curve based on preset information under the handle throwing stopping control instruction; generating a target speed curve based on a maximum motor deceleration capacity of the device under the rapid stopping control instruction; and controlling the device to perform stopping according to the target speed curve.

According to one aspect of the present application, a stopping apparatus for a device with a hoisting mechanism is proposed and includes: a position module, configured to acquire position offset information of a hoisting handle of the device in real time; a calculating module, configured to generate a displacement change rate according to the position offset information when the position offset information meets a triggering condition; an instruction module, configured to compare the displacement change rate with a preset threshold to generate a stopping control instruction; and a control module, configured to control an overhead system of the device to perform deceleration stopping according to the stopping control instruction.

In an embodiment of the present application, further comprises: a threshold module, configured to generate the preset threshold based on a relationship between motor torque characteristics of the device and the displacement change rate of the hoisting handle.

In an embodiment of the present application, the preset threshold comprises the first threshold and the second threshold; the threshold module is further configured to generate the first threshold based on the displacement change rate of the motor of the device following the speed of the hoisting handle under a normal condition, and generate the second threshold according to the displacement change rate of the hoisting handle during automatic return.

In an embodiment of the present application, the position module is further configured to acquire position offset information through a displacement sensor set on the hoisting handle of the device.

In an embodiment of the present application, the calculating module comprises a condition unit, configured to calculate a displacement ratio of the hoisting handle through the position offset information, wherein when the displacement ratio is greater than a displacement threshold, a precondition is triggered, and when the precondition is met and the displacement ratio is reduced to 0, the triggering condition is determined to be met, and the deceleration stopping function is triggered.

In an embodiment of the present application, the calculating module further comprises a rate unit, configured to acquire a plurality of position offset information, and generate the displacement change rate according to the plurality of position offset information.

In an embodiment of the present application, the rate unit is also configured to acquire a plurality of frames of signals of the displacement sensor through a CAN to generate the plurality of position offset information.

In an embodiment of the present application, the rate unit is also configured to fit the plurality of position offset information based on a least square method to generate the displacement change rate.

In an embodiment of the present application, the instruction module comprises: a first instruction unit, configured to generate a normal stopping control instruction when the displacement change rate is less than or equal to a first threshold; a second instruction unit, configured to generate a handle throwing stopping control instruction when the displacement change rate is greater than the first threshold and less than a second threshold; and a third instruction unit, configured to generate a rapid stopping control instruction when the displacement change rate is greater than or equal to the second threshold.

In an embodiment of the present application, the control module includes: a first speed unit, configured to generate a target speed curve based on the position offset information under the normal stopping control instruction; a second speed unit, configured to generate a target speed curve based on the preset information under the handle throwing stopping control instruction; a third speed unit, configured to generate a target speed curve based on a maximum motor deceleration capability of the device under the rapid stopping control instruction; and a control unit, configured to control the device to perform stopping according to the target speed curve.

According to one aspect of the present application, a crane is proposed and includes an onboard controller, and the onboard controller may implement the above stopping method for the device with the hoisting mechanism.

According to one aspect of the present application, an electronic device is proposed and includes one or more processors; and a storage apparatus, configured to store one or more programs, and the one or more programs, when executed by the one or more processors, cause the one or more processors to implement the above method.

According to one aspect of the present application, a computer readable medium is proposed, storing a computer program, and the program, when executed by a processor, implements the above method.

According to the stopping method and apparatus for the device with the hoisting mechanism, the crane, the electronic device and the computer readable medium of the present application, the position offset information of the hoisting handle of the device is acquired in real time; the displacement change rate is generated according to the position offset information when the position offset information meets the triggering condition; the displacement change rate is compared with the preset threshold to generate the stopping control instruction; and a mode of controlling the overhead system of the crane to perform deceleration stopping according to the stopping control instruction. And thus, the present application may achieve the purpose of rapid stopping control only through the hoisting handle of the crane, and reduce the requirement for the driver's reaction time and increase the safety of the device when emergency stopping is required.

According to the stopping method and apparatus for the device with the hoisting mechanism, the crane, the electronic device and the computer readable medium of the present application, compared with a traditional automobile crane control method, a control method of the present application enriches a function of the hoisting handle, and not only can achieve conventional hoisting acceleration and deceleration control, but also can achieve handle rapid pushing to achieve rapid stopping control. When there is an emergency stopping need, a driver may preferably rely on the rapid operation of the hoisting handle to achieve rapid deceleration stopping, and the driver does not need to "loosening the handle and then pressing the emergency stopping button", which reduces the reaction time requirement for the driver.

According to the stopping method and apparatus for the device with the hoisting mechanism, the crane, the electronic device and the computer readable medium of the present application, a variable deceleration control method is put forward in a case of rapid stopping, and compared with existing emergency stopping control, this rapid deceleration control method ensures that deceleration is continuously reduced, a brake is put in in a case that the deceleration is small enough, and brake impact caused by emergency stopping is avoided while rapid stopping of hoisting of the crane is ensured.

It should be understood that the general description above and the detailed description below are illustrative only and do not limit the present application.

BRIEF DESCRIPTION OF DRAWINGS

These and other objectives, features and advantages of the present application will become more apparent by describing their exemplary embodiments in detail with reference to accompanying drawings. The accompanying drawings described below are only some embodiments of the present application, and those ordinarily skilled in the art may further obtain other accompanying drawings according to these accompanying drawings without creative effort.

DETAILED DESCRIPTION OF THE EMBODIMENTS

Figure 1:
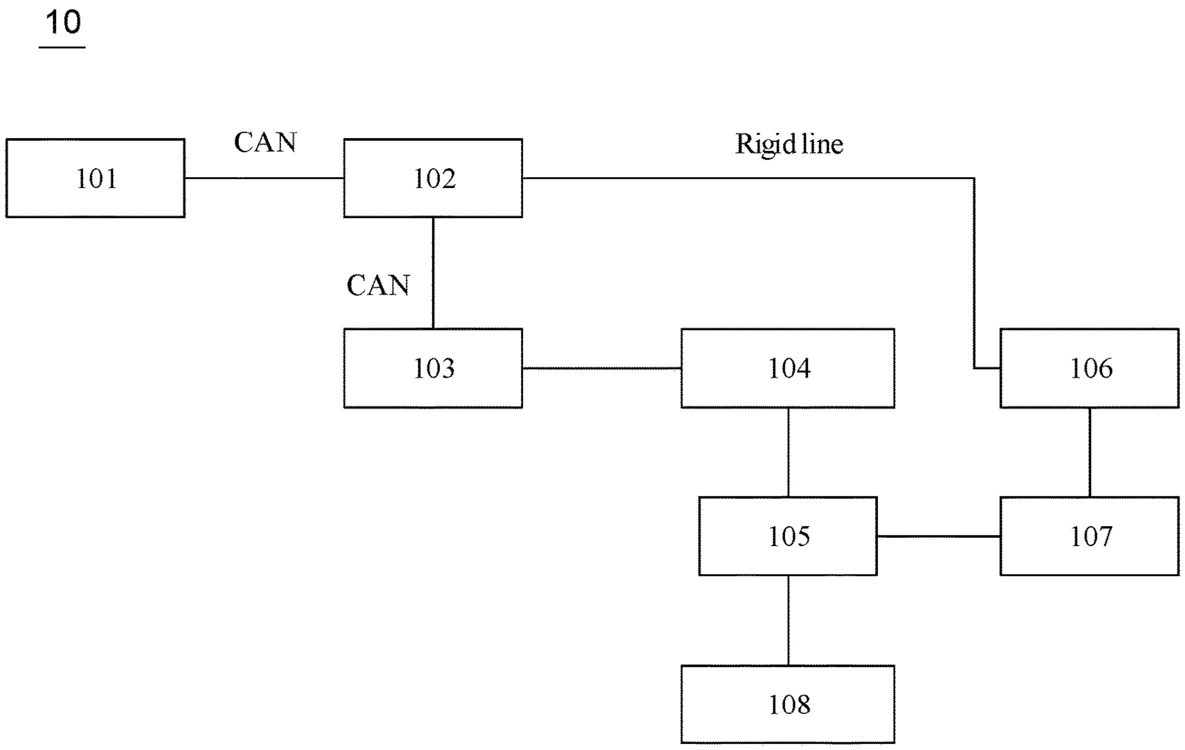
FIG. 1 is a system block diagram of a stopping method and apparatus for a device with a hoisting mechanism shown by an embodiment of the present application.

Exemplary embodiments will now be described more fully with reference to the accompanying drawings. However, the exemplary embodiments may be implemented in a variety of forms and should not be understood to be limited to the embodiments set forth herein; and rather, these embodiments are provided so that the present application will be comprehensive and complete, and the idea of the exemplary embodiments will be fully conveyed to those skilled in the art. The same reference numerals in the accompanying drawings represent the same or similar parts, so repeated descriptions of them will be omitted.

In addition, described features, structures or properties may be combined in any suitable mode in one or more embodiments. In the description below, many specific details are provided to give a full understanding of the embodiments of the present application. However, those skilled in the art will be aware that the technical solution of the present application may be practiced without one or more of specific details, or other methods, components, apparatuses, steps, etc. may be employed. In other cases, known methods, apparatuses, cranes, implementations or operations are not shown or described in detail to avoid blurring of aspects of the present application.

The block diagrams shown in the accompanying drawings are only functional entities and do not necessarily correspond to physically separate entities. That is, these functional entities may be implemented in a form of software, or, these functional entities may be implemented in one or more hardware modules or integrated circuits, or these functional entities may be implemented in different network and/or processor apparatuses and/or microcontroller apparatuses.

The flow diagrams shown in the accompanying drawings are exemplarily illustrated only and do not have to include all contents and operations/steps, nor do they have to be performed in an order described. For example, some operations/steps may also be decomposed, while some operations/steps may be merged or partially merged, so an actual order of execution may change according to the actual situation.

It should be understood that while the terms first, second, third, etc. may be used in this article to describe various components, these components should not be restricted by these terms. These terms are used to distinguish one component from another. Accordingly, a first component discussed below may be referred to as a second component without deviating from teaching of the concepts of the present application. As used herein, the term "and/or" includes any one and all combinations of one or more of associated listed items.

Those skilled in the art may understand that the accompanying drawings are only schematic diagrams of the exemplary embodiments, and modules or processes in the accompanying drawings are not necessarily necessary for the implementation of the present application, and therefore cannot be used to limit the scope of protection of the present application.

In view of technical defects existing in the prior art, the present application proposes a stopping method and apparatus for a device with a hoisting mechanism, which may be applied to a new energy automobile crane overhead driving system directly driven based on a motor, and a control method in the present application judges a driver's operation intention through an overhead controller and issues a control instruction, and deceleration stopping is executed through a motor controller, a motor and a hydraulic brake.

The judgment of the driver's operation intention in deceleration stopping control includes judgment of a stopping intention and a deceleration intention. The stopping intention is judged by the displacement of the hoisting operation handle, and the deceleration intention is judged by the displacement change rate of the handle when the driver operates the handle to the middle position. When the hoisting handle is returned to the middle position, the onboard controller judges it as the deceleration stopping control, and according to the displacement change rate of the hoisting handle, the driver's deceleration intention is divided into three categories: normal stopping, handle throwing stopping and rapid stopping.

"Rapid stopping" in the deceleration intention in the present application is different from emergency stopping in the following aspects: emergency stopping means that after pressing the emergency stop button, the brake is directly put into deceleration (regardless of the current mechanism speed), which has serious impact; the rapid stopping function requires that when the driving system can still work normally, it can actively decelerate through the driving system and control deceleration to change continuously to reduce the deceleration impact of the crane; and only when the driving system is abnormal and cannot meet the deceleration requirement, the onboard controller will issue an emergency stopping instruction and control the brake system to perform emergency stopping.

The content of the present application is described in detail by means of specific embodiments.

FIG. 1 is a system block diagram of a stopping method and apparatus for a device with a hoisting mechanism shown by an embodiment of the present application. The present application may be mainly achieved through an automobile crane electric drive operation hoisting control system with an onboard controller and a motor controller as the core. As shown in FIG. 1, a system architecture 10 may include a hoisting control handle 101, an onboard controller 102, a motor controller 103, a permanent magnet synchronous motor 104, a decelerator 105, a solenoid valve 106, a hydraulic brake 107, and a hoisting drum mechanism 108.

The onboard controller 102 may communicate with the hoisting control handle 101 through a CAN bus, and is responsible for receiving, analyzing and sending a displacement signal of the handle 101. The onboard controller 102 outputs an on or off instruction through rigid line to control the hydraulic brake 107. The permanent magnet synchronous motor 104 is connected with the motor controller 103 and the decelerator 105 and is responsible for executing a motor deceleration control command sent by the motor controller 103. The motor controller 103 detects a current running speed of the permanent magnet synchronous motor 104 in real time through an encoder installed on the permanent magnet synchronous motor 104, and feeds it back to the onboard controller 102. The permanent magnet synchronous motor 104 serves as a direct driving unit for motion of a mechanism, and an output shaft will drive the decelerator 105 and the hoisting drum mechanism 108 to work to achieve the brake force output of the mechanism.

The relationship between the displacement of the hoisting control handle (also referred to as the handle) 101 and the working state of the hoisting mechanism is as follows: the hoisting control handle 101 is in the middle position (that is, the displacement of the handle is 0), the target speed curve of the permanent magnet synchronous motor 104 is zero, and the hoisting mechanism does not run; and when the hoisting control handle 101 is pushed forward (that is, the displacement of the handle is negative), the target speed curve of the permanent magnet synchronous motor 104 is negative, and the hoisting mechanism goes down. When the hoisting control handle 101 is pushed back (that is, the handle displacement is positive), the target speed curve of the permanent magnet synchronous motor 104 is positive, and the hoisting mechanism goes up. The onboard controller 102 may, for example, acquire position offset information of the hoisting handle 101 of a crane in real time; when the position offset information meets a triggering condition, the onboard controller 102 may, for example, generate a displacement change rate according to the position offset information; the onboard controller 102 may, for example, compare the displacement change rate with a preset threshold to generate a stopping control instruction; and the onboard controller 102 controls an overhead system of the crane to perform deceleration stopping according to the stopping control instruction.

It should be noted that the stopping method for the device with the hoisting mechanism provided in the embodiment of the present application may be executed by the onboard controller 102, and accordingly, the stopping apparatus for the device with the hoisting mechanism may be arranged in the onboard controller 102. The motor controller 103, the permanent magnet synchronous motor 104, the decelerator 105, the solenoid valve 106, the hydraulic brake 107, the hoisting drum mechanism 108 and other components work directly or indirectly according to the instruction issued by the onboard controller 102.

The present application proposes a method to achieve rapid stopping directly by operating the handle, judge the driver's stopping intention according to the position of the handle, judge the driver's deceleration intention according to the displacement of the handle and the displacement change rate, and perform rapid stopping when the displacement change rate of the handle is large under the stopping intention.

A rapid braking method in the present application first performs deceleration according to a larger deceleration speed, and when the speed of the hoisting motor is close to zero, it ensures that the continuous change of the deceleration speed is reduced to avoid the deceleration impact. The present application uses a control system which issues the instruction from the onboard controller to the motor controller and the brake, decouples the brake and a driver, and may realize a complex control algorithm.

Figure 2:
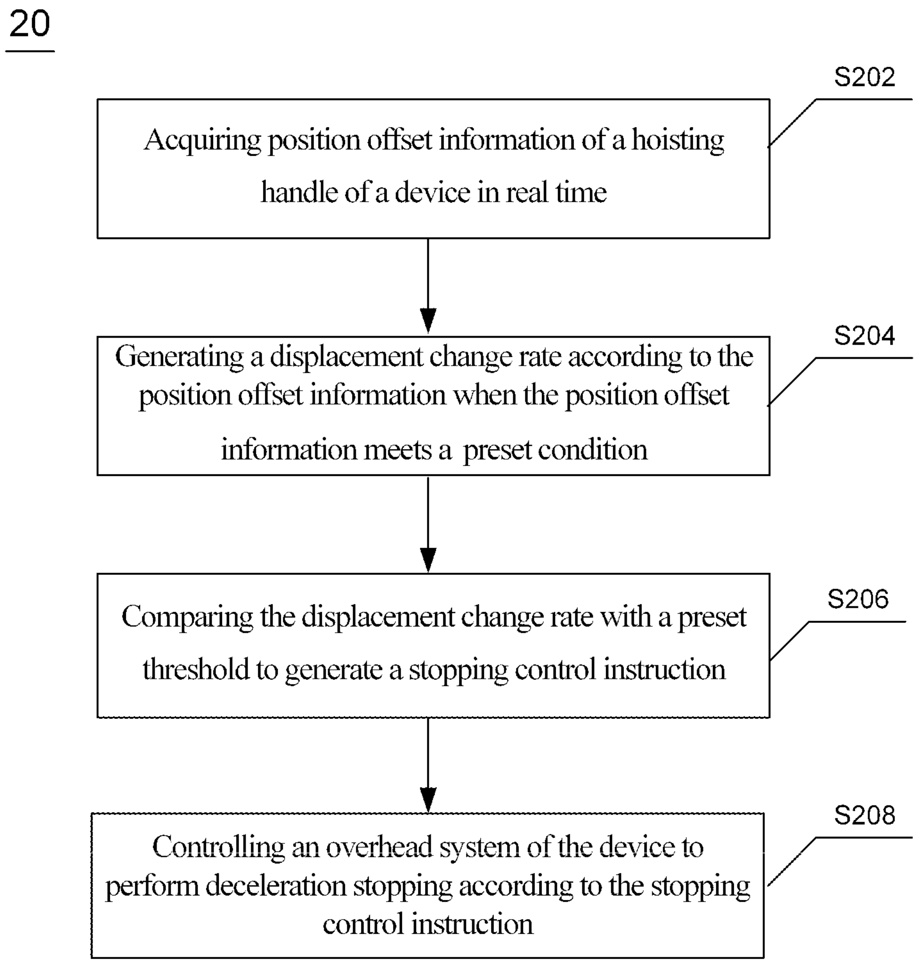
FIG. 2 is a flow diagram of a stopping method for a device with a hoisting mechanism shown by an embodiment of the present application.

FIG. 2 is a flow diagram of a stopping method for a device with a hoisting mechanism shown by an embodiment of the present application. The stopping method 20 for the device with the hoisting mechanism at least includes steps S202 to S208.

As shown in FIG. 2, S202, acquiring position offset information of a hoisting handle of the device in real time. For example, the position offset information may be acquired through a displacement sensor set on the hoisting handle of the crane.

S204, generating a displacement change rate according to the position offset information when the position offset information meets a triggering condition. For example, a displacement ratio of the hoisting handle may be calculated through the position offset information. When the displacement ratio is greater than a displacement threshold, a precondition is triggered. When the precondition is met and the displacement ratio decreases to 0, the triggering condition is determined to be met, and the deceleration stopping function is triggered. The displacement ratio is a percentage of a displacement angle of the handle to a total controllable range of the handle, and the displacement threshold is a threshold of the displacement ratio during judging the stopping control conditions.

A driver's operating handle displacement x and the displacement change rate k serve as driver's stopping and deceleration intention judgement variables. When the hoisting handle is pulled to the middle position (x=0), the onboard controller judges that the driver has a stopping intention, and executes the driver's deceleration intention judgement (if the k value is large, it considers that the driver needs to perform rapid stopping, and if the k value is small, it considers that the driver needs to perform slow stopping), a deceleration stopping control curve is planned, and deceleration and stopping control is executed.

In order to conveniently judge the driver's stopping intention, a state variable may be defined: a precondition variable m, a stopping condition variable ", where m and" are both Boolean type variables, and default values are both 0. In a specific embodiment, the triggering condition of the deceleration and stopping intention is: when the handle displacement ratio is greater than 5% (displacement threshold), the precondition m=1 is triggered; when the handle displacement is reduced to 0% and m=1, a stopping condition n=1 is triggered, it enters in deceleration stopping control, and the precondition is set to be zero (m=0); and for example, after the actual speed of the motor is reduced to 0, the stopping condition is reset to be zero n=0.

Generating the displacement change rate according to the position offset information includes: a plurality of offset offset information is acquired; and the displacement change rate is generated according to the plurality of offset offset information.

For example, a plurality of frames of signals of a displacement sensor are acquired through a CAN to generate the plurality of offset offset information. It may also be as that the plurality of position offset information are fitted based on a least square method to generate the displacement change rate.

Figure 3:
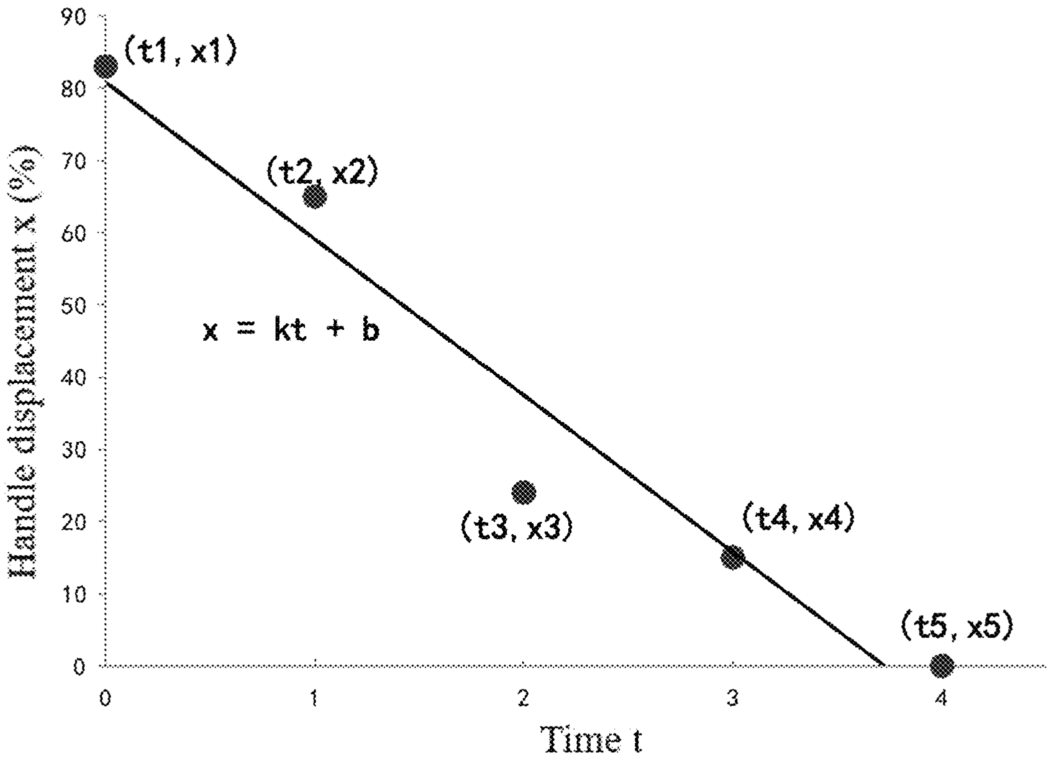
FIG. 3 is a schematic diagram of a stopping method for a device with a hoisting mechanism shown by an embodiment of the present application.

As shown in FIG. 3, after the deceleration stopping function is triggered (n=1), an overhead controller acquires five frames of signals $(x_1, t_1)$, $(x_2, t_2)$, $(x_3, t_3)$, $(x_4, t_4)$ and $(x_5, t_5)$ before the deceleration stopping function is triggered through the CAN, and the five frames of signals are fitted to be a linear function through the least square method:

$$x=kt+b,$$

wherein b is a function intercept, and t is time.

A solution formula of the handle displacement change rate in the deceleration process is as follows:

$$\begin{cases} \sum (kt_i + b - x_i)t_i = 0 \\ \sum (kt_i + b - x_i) = 0 \end{cases}, (i = 1, 2, 3, 4, 5).$$

S206, comparing the displacement change rate with the preset threshold to generate a stopping control instruction. For example, when the displacement change rate is less than or equal to a first threshold, a normal stopping control instruction is generated; when the displacement change rate is greater than the first threshold and less than a second threshold, a handle throwing stopping control instruction is generated; and when the displacement change rate is greater than or equal to the second threshold, a rapid stopping control instruction is generated.

The generating process of the first threshold and the second threshold will be described in detail in the corresponding embodiment in FIG. 4. The first threshold and the second threshold may be stored in the onboard controller in advance and may be directly called out for comparison when needed.

S208, controlling the overhead system of the device according to the stopping control instruction to perform deceleration stopping, in a case of different change rates, the target speed curve is generated according to different strategies, the crane is controlled to perform stopping according to the target speed curve, and a specific content will be described in detail in the embodiment corresponding to FIG. 6.

According to the stopping method for the device with the hoisting mechanism of the present application, the position offset information of the hoisting handle of the crane is acquired in real time; the displacement change rate is generated according to the position offset information when the position offset information meets the triggering condition; the displacement change rate is compared with the preset threshold to generate the stopping control instruction; and a mode of controlling the overhead system of the crane to perform deceleration stopping according to the stopping control instruction can achieve the purpose of rapid stopping control only through the hoisting handle of the crane, and reduce the requirement for the driver's reaction time and increase the safety of the device when emergency stopping is required.

It should be clearly understood that the present application describes how to form and use specific examples, but the principles of the present application are not limited to any details of these examples. On the contrary, based on the teaching of the content disclosed in the present application, these principles may be applied to many other embodiments.

Figure 4:
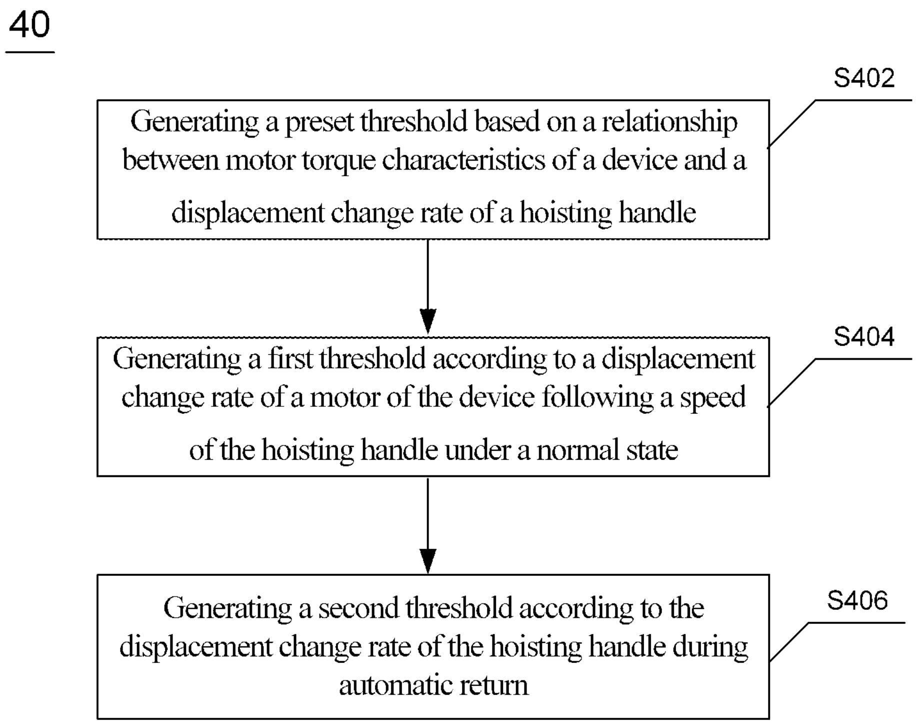
FIG. 4 is a flow diagram of a stopping method for a device with a hoisting mechanism shown by an embodiment of the present application.

FIG. 4 is a flow diagram of a stopping method for a device with a hoisting mechanism shown by an embodiment of the present application. A flow 40, shown in FIG. 4, is a detailed description of "generating a preset threshold based on a relationship between motor torque characteristics of the device and a displacement change rate of a hoisting handle." The preset threshold may include a first threshold and a second threshold, the displacement change rate of the handle may be divided into three different intervals through the first threshold and the second threshold, and then different stopping methods may be determined according to characteristics of different intervals. More specifically, the first threshold is an upper limit of deceleration at which the mechanism speed can normally follow the target speed of the handle in a normal speed regulation process; and the second threshold is an automatic return rate of the handle when the operating handle is quickly released when the handle is in an open state. For details, see the description below.

As shown in FIG. 4, S402, generating the preset threshold based on the relationship between the motor torque characteristics of the device and the displacement change rate of the hoisting handle.

A hoisting control principle is: a driver operates the hoisting handle, and the onboard controller receives a handle displacement signal, then looks up a table according to the signal to acquire the motor target speed (each position of the handle has a pre-stored target speed corresponding to it), and queries the target acceleration of a motor according to the target speed and the actual motor speed. The onboard controller sends the target speed and the acceleration to a motor controller, the motor controller performs speed regulation according to the target speed and the acceleration, and sends the actual motor speed to the overhead controller.

When a target speed change rate queried according to the handle displacement is greater than the target acceleration, the actual motor speed cannot follow the target speed of the handle in real time. According to the above principle, the first threshold and the second threshold are determined respectively.

S404, generating the first threshold according to the displacement change rate of the motor of the device following the speed of the hoisting handle under a normal state. More specifically, the first threshold is the upper limit of deceleration at which the mechanism speed can normally follow the target speed of the handle in the normal speed regulation process.

S406, generating the second threshold according to the displacement change rate of the hoisting handle during automatic return. More specifically, the second threshold is the automatic return rate of the handle when the operating handle is quickly released when the handle is in the open state.

Figure 5:
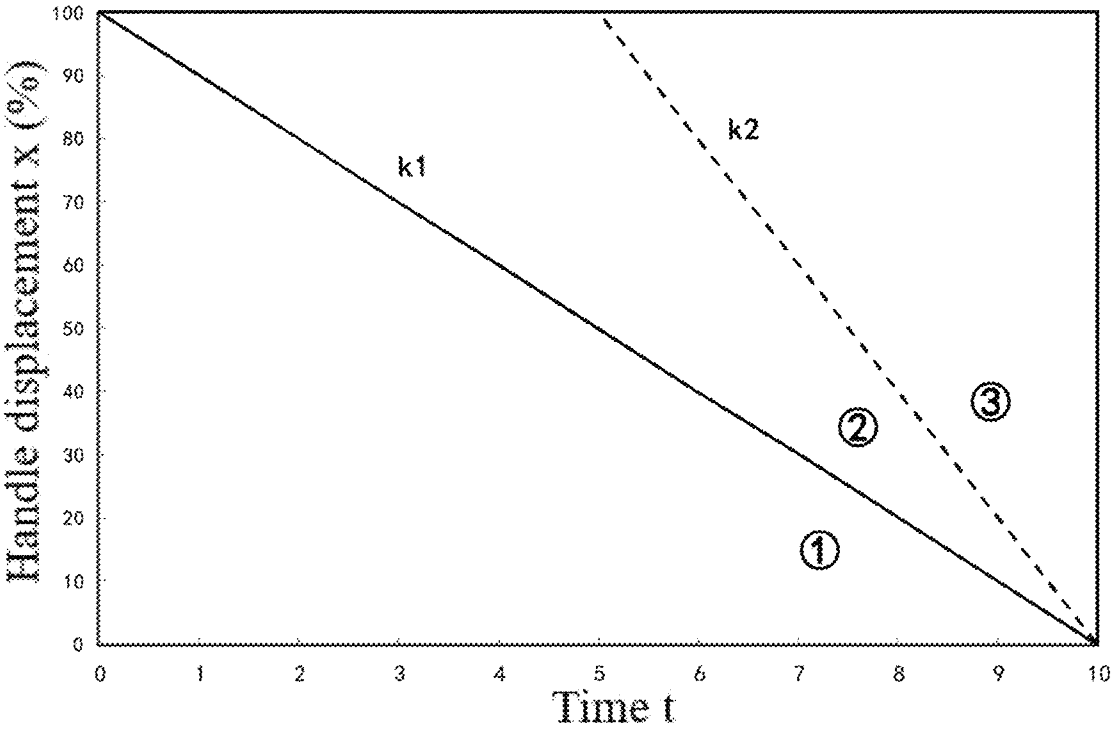
FIG. 5 is a schematic diagram of a stopping method for a device with a hoisting mechanism shown by an embodiment of the present application.

More specifically, in one embodiment, three different intervals corresponding to the displacement change rate may be divided according to the first threshold and the second threshold. According to the speed of handle operated by the driver, the deceleration intention is divided into three types, as shown in FIG. 5: ① normal stopping, ② handle throwing stopping and ③ rapid stopping. The first threshold is $k_1$, the second threshold is $k_2$, $k_1$ is the upper limit of deceleration at which the mechanism speed can normally follow the target speed of the handle in the normal speed regulation process, and $k_2$ is the automatic return rate of the handle when the operating handle is quickly released when the handle is in the open state.

The driver operates the handle to control deceleration of a crane, a deceleration intention dividing mode according to the speed change rate k of the handle includes: $k<k_1$ is "normal stopping" intention (region ①), and a speed of a deceleration process is reduced following a target speed converted by handle operated by the driver; $k_1<k<k_2$ is "handle throwing stopping" intention (region ②), and the handle displacement speed in the state exceeds a maximum deceleration in a normal speed regulation state, but a speed at which the handle returns to a middle position is less than the speed in automatic centering of the handle; and $k>k_2$ is "rapid stopping" intention (region ③, and the driver rapidly pushes the operating handle to the middle position and executes emergency deceleration.

Figure 6:
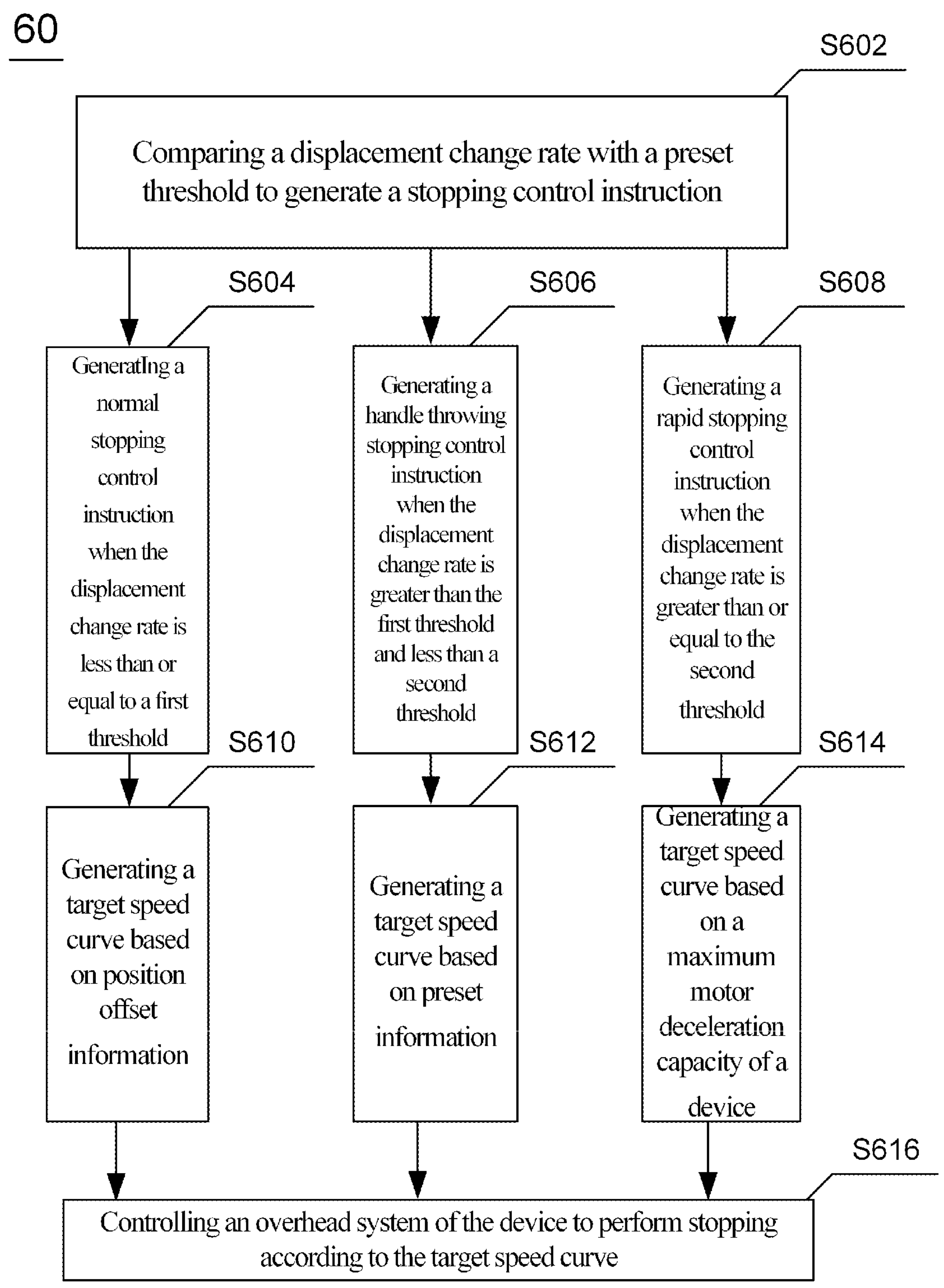
FIG. 6 is a flow diagram of a stopping method for a device with a hoisting mechanism shown by an embodiment of the present application.

FIG. 6 is a flow diagram of a stopping method for a device with a hoisting mechanism shown by an embodiment of the present application. A flow 60 shown in FIG. 6 is a detailed description of "controlling an overhead system of a crane to perform deceleration stopping according to a stopping control instruction" of S208 in the flow shown in FIG. 2.

As shown in FIG. 6, S602, comparing a displacement change rate with a preset threshold to generate a stopping control instruction.

S604, generating a normal stopping control instruction when the displacement change rate is less than or equal to a first threshold

S606, generating a handle throwing stopping control instruction when the displacement change rate is greater than the first threshold and less than a second threshold.

S608, generating a rapid stopping control instruction when the displacement change rate is greater than or equal to the second threshold.

Figure 7:
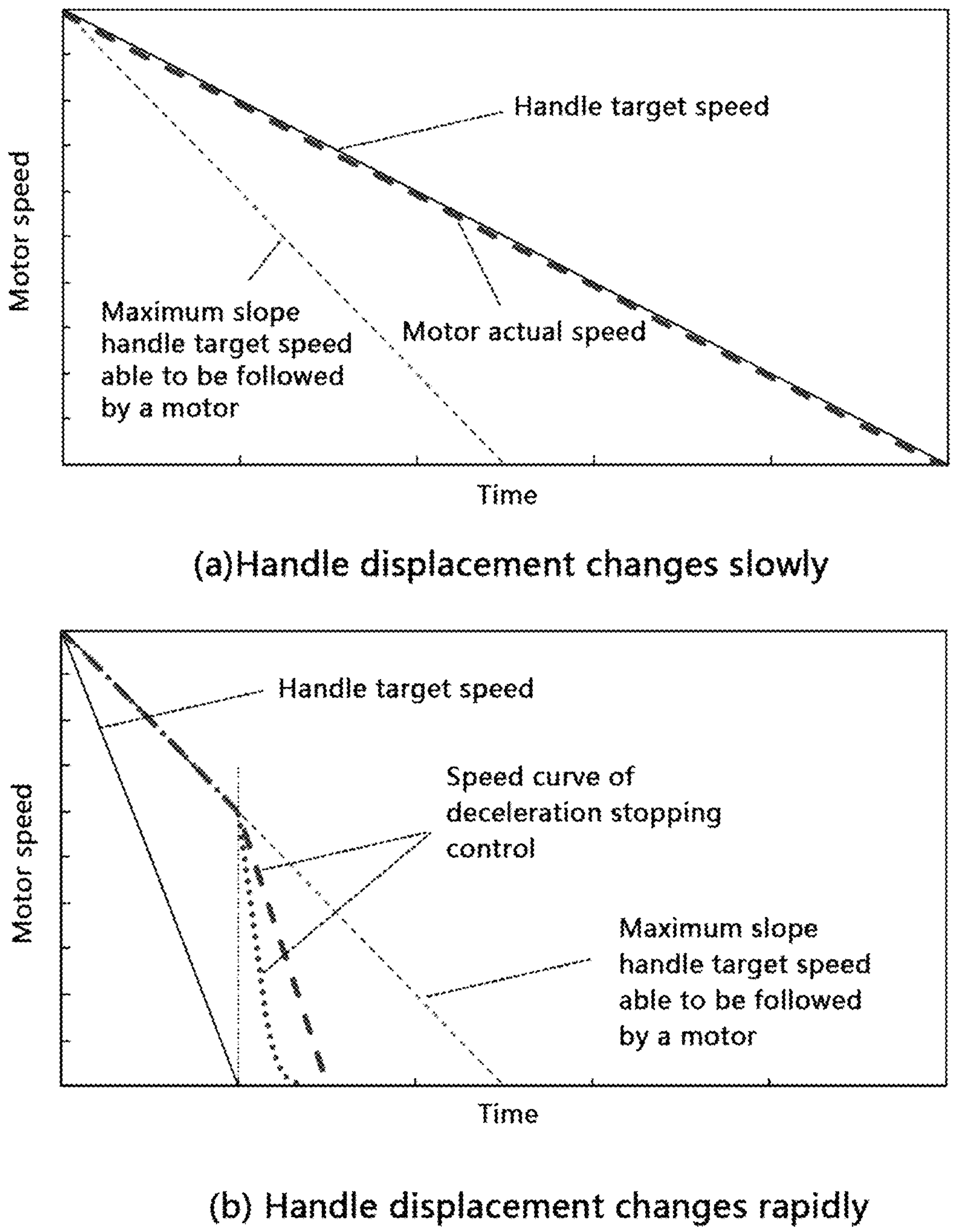
FIGS. 7A and 7B are schematic diagrams of a stopping method for a device with a hoisting mechanism shown by an embodiment of the present application.

The handle is operated to return to a middle position, if the displacement of the handle changes slowly (FIG. 7A, the motor speed may follow the target speed of the handle in real time), a motor decelerates following the target speed of the handle, and the deceleration is the change rate of the target speed of the handle, and a brake is put in after the actual motor speed reaches zero. If the displacement of the handle changes rapidly (FIG. 7B, the motor speed cannot follow the target speed of the handle in real time, and the motor is still in a deceleration state after the handle returns to the middle position), then after the speed of a target speed curve of the handle is reduced to zero, an onboard controller executes deceleration according to a control curve of deceleration stopping, and after the speed reaches the brake input speed, the brake is put in.

S610, generating the target speed curve based on position offset information. When it is judged as "normal stopping", a deceleration stopping process does not define a specific deceleration, and the motor speed directly follows the target speed of the handle. When the speed of the target speed curve of the process decelerates to 0, the brake is put into use.

Figure 8:
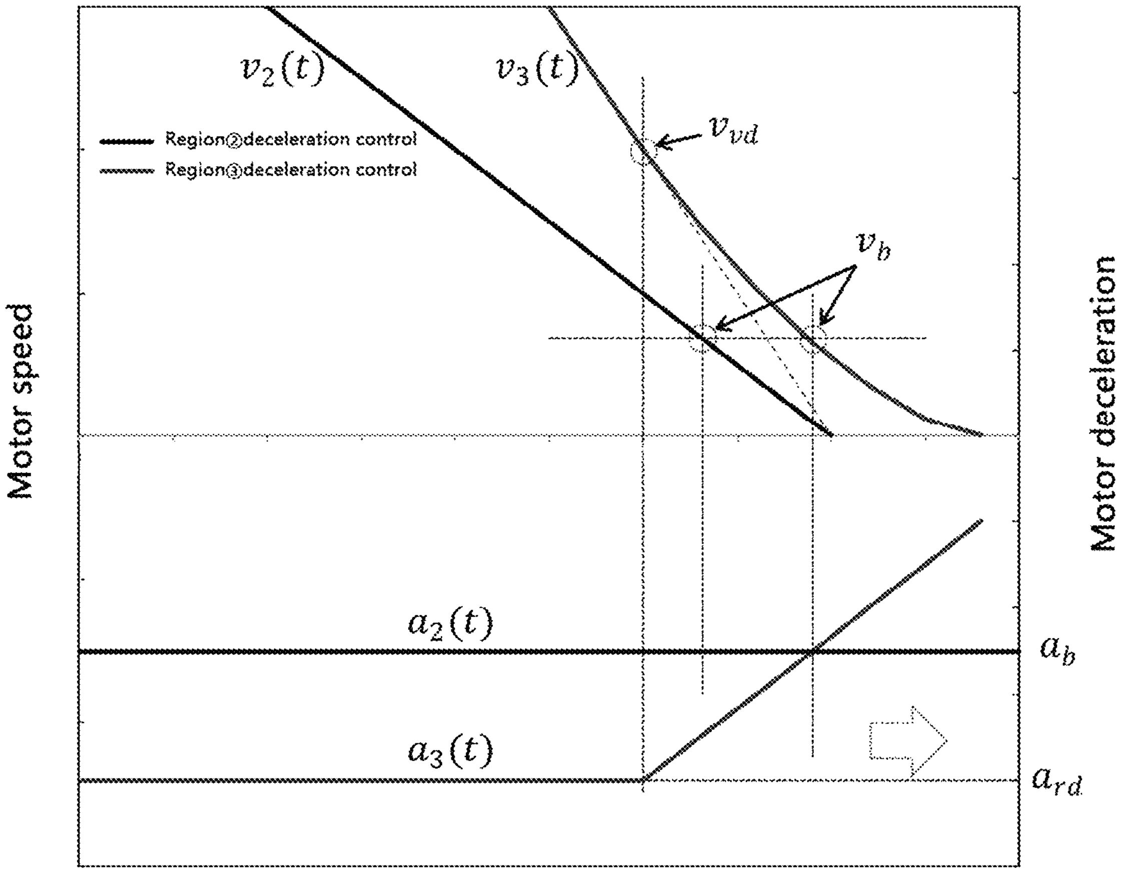
FIG. 8 is a schematic diagram of a stopping method for a device with a hoisting mechanism shown by an embodiment of the present application.

S612, generating the target speed curve based on preset information. When it is judged as "handle throwing stopping", as shown in FIG. 8, the motor speed is reduced following a uniform deceleration curve $v_2(t)$, a deceleration value is set as $a_2(t)$, and $a_2(t)=a_b$. When the actual mechanism speed is lower than the brake input speed, namely $v_2(t)<v_b$, the brake is put into use. According to mechanism characteristics, a real vehicle test is performed, optimal $a_b$ and $v_b$ are calibrated, and it is ensured that no impact exists in the deceleration process while it is ensured that $a_b$ is as big as possible.

S614, generating the target speed curve based on a maximum motor deceleration capability of the device. When it is judged as "rapid stopping", as shown in FIG. 8, the motor speed is reduced following a speed curve $v_3(t)$ and a deceleration curve $a_3(t)$, the deceleration process includes a stage of rapid uniform deceleration with a deceleration $a_{rd}$, and a variable deceleration stage in which the deceleration is gradually reduced. The deceleration curve $a_3(t)$ is initialized to be $a_{rd}$, and the deceleration process maintains the deceleration value firstly. When the actual speed of the mechanism is lower than $v_{vd}$, the deceleration begins to be continuously reduced; and when the target deceleration is reduced to $a_b$, the brake is put in.

Definition of an initial value $a_{rd}$ of the above deceleration curve $a_3(t)$ may be designed according to the maximum motor deceleration capability, and the motor is decelerated according to characteristics of the motor at this time.

More specifically, deceleration values of ascending and descending of the hoisting mechanism may be determined respectively by a maximum torque provided by the motor at the current speed, a speed ratio of a hoisting decelerator, a radius of a hoisting drum, the number of layers of wire ropes wound on the current hoisting drum, a diameter of the wire ropes, a wire rope multiplying power, a hoisting load mass and a gravity acceleration. The deceleration curve $v_2(t)$ has debugged no-impact brake input deceleration $a_b$ and brake input speed $v_b$, and it may be ensured that when the deceleration is $a_3(t)=a_b$, the speed is $v_3(t)=v_b$ by adjusting the deceleration change rate (J) in the curve $v_3(t)$ and a speed $v_{vd}$ at a variable deceleration starting point, and at the time, when the brake is put into use, it may be ensured that "rapid stopping" control has no impact. Therefore, all control variables in the deceleration process need to meet a condition:

$$v_{vd} = v_b + \frac{a_{rd}^2 - a_b^2}{2J}$$

A J value may be determined through a historical experience value, and a too large J value will cause deceleration impact; and a too small J value will cause too slow stopping. When there is no design experience, the deceleration change rate may be debugged through the following methods: firstly, the small J value is adopted, and whether there is no impact during mechanism deceleration stopping is in field test; and after it is ensured that there is no mechanism impact, the J value is properly increased, and then test is made. The above process is repeated, the test ends when impact appears in a mechanism, and a value slightly less than J when impact appears is selected as a designed J value.

S616, controlling the overhead system of the device to perform stopping according to the target curve speed.

Those skilled in the art may understand that all or part of the steps to implement the above embodiments are implemented as computer programs executed by a CPU. When the computer programs are executed by the CPU, the programs that execute the functions defined by the above method provided by the present application may be stored in a computer readable storage medium, which may be a read-only memory, disk or optical disc, etc.

In addition, it needs to be noted that above accompanying drawings are schematic specifications of processes included in the method according to the exemplary embodiments of the present application and are not for a restrictive purpose. It is easy to understand that these processes shown in the above accompanying drawings does not indicate or limit a time order of the processing. Also, it is easy to understand that these processes may be performed, for example, synchronously or asynchronously in a plurality of modules.

The following is embodiments of an apparatus of the present application, which may be configured to execute the embodiments of the method of the present application. For details not disclosed in the embodiments of the apparatus of the present application, please refer to the embodiments of the method of the present application.

Figure 9:
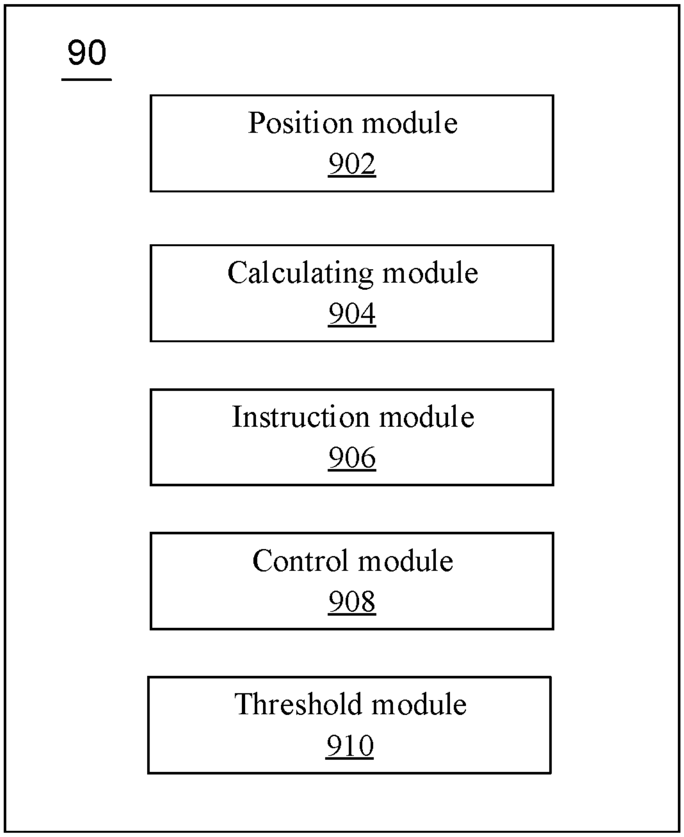
FIG. 9 is a block diagram of a stopping apparatus for a device with a hoisting mechanism shown by an embodiment of the present application.

FIG. 9 is a block diagram of a stopping apparatus for a device with a hoisting mechanism shown by an embodiment of the present application. As shown in FIG. 9, the stopping apparatus for the device with the hoisting mechanism includes: a position module 902, a calculating module 904, an instruction module 906, a control module 908 and a threshold module 910.

The position module 902 is configured to acquire position offset information of a hoisting handle of the device in real time; and the position module is further configured to acquire position offset information through a displacement sensor set on the hoisting handle of the device.

The calculating module 904 is configured to generate a displacement change rate according to the position offset information when the position offset information meets a triggering condition; the calculating module includes a condition unit, configured to calculate a displacement ratio of the hoisting handle through the position offset information, wherein when the displacement ratio is greater than a displacement threshold, a precondition is triggered, and when the precondition is met and the displacement ratio is reduced to 0, the triggering condition is determined to be met, and the deceleration stopping function is triggered; and a rate unit, configured to acquire a plurality of position offset information, and generate the displacement change rate according to the plurality of position offset information.

The rate unit is also configured to acquire a plurality of frames of signals of the displacement sensor through a CAN to generate the plurality of position offset information. The rate unit is also configured to fit the plurality of position offset information based on a least square method to generate the displacement change rate.

The instruction module 906 is configured to compare the displacement change rate with a preset threshold to generate a stopping control instruction. The instruction module includes: a first instruction unit, configured to generate a normal stopping control instruction when the displacement change rate is less than or equal to a first threshold; a second instruction unit, configured to generate a handle throwing stopping control instruction when the displacement change rate is greater than the first threshold and less than a second threshold; and a third instruction unit, configured to generate a rapid stopping control instruction when the displacement change rate is greater than or equal to the second threshold.

The control module 908 is configured to control an overhead system of the device to perform deceleration stopping according to the stopping control instruction. The control module includes: a first speed unit, configured to generate a target speed curve based on the position offset information under the normal stopping control instruction; a second speed unit, configured to generate a target speed curve based on the preset information under the handle throwing stopping control instruction; a third speed unit, configured to generate a target speed curve based on a maximum motor deceleration capability of the device under the rapid stopping control instruction; and a control unit, configured to control the device to perform stopping according to the target speed curve.

The threshold module 910 is configured to generate the preset threshold based on a relationship between motor torque characteristics of the device and the displacement change rate of the hoisting handle. The preset threshold includes the first threshold and the second threshold. The threshold module is also configured to generate the first threshold based on the displacement change rate of the motor of the device following the speed of the hoisting handle under a normal condition, and generate the second threshold according to the displacement change rate of the hoisting handle during automatic return.

According to the stopping apparatus for the device with the hoisting mechanism of the present application, the position offset information of the hoisting handle of the crane is acquired in real time; the displacement change rate is generated according to the position offset information when the position offset information meets the triggering condition; the displacement change rate is compared with the preset threshold to generate the stopping control instruction; and a mode of controlling the overhead system of the crane to perform deceleration stopping according to the stopping control instruction can achieve the purpose of rapid stopping control only through the hoisting handle of the crane, and reduce the requirement for the driver's reaction time and increase the safety of the crane when emergency stopping is required.

The present application further provides a crane, the crane includes an onboard controller, and the onboard controller achieves the following functions: position offset information of a hoisting handle of the crane is acquired in real time; a displacement change rate is generated according to the position offset information when the position offset information meets a triggering condition; the displacement change rate is compared with a preset threshold to generate a stopping control instruction; and an overhead system of the device is controlled to perform deceleration stopping according to the stopping control instruction.

Figure 10:
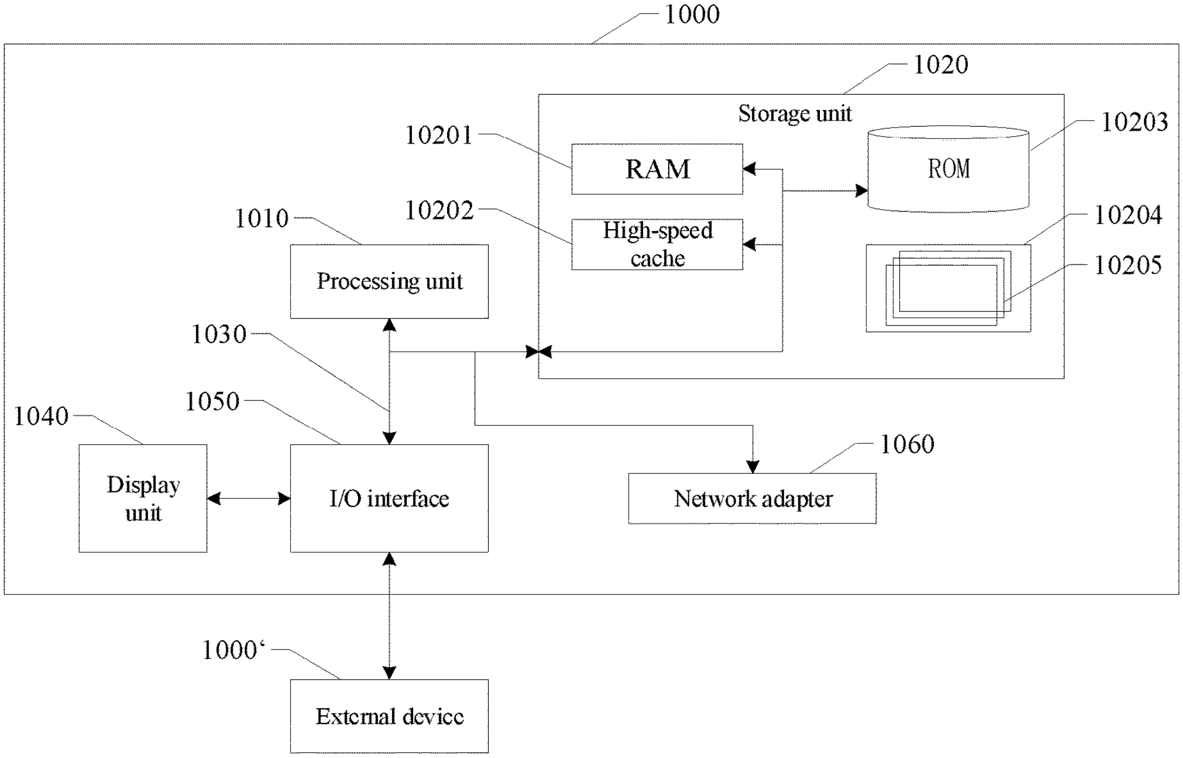
FIG. 10 is a block diagram of an electronic device shown by an embodiment of the present application.

FIG. 10 is a block diagram of an electronic device shown by an embodiment of the present application.

The electronic device 1000 according to this implementation of the present application is described below with reference to FIG. 10. The electronic device 1000 shown in FIG. 10 is only an example and should not impose any limitations on the functionality and scope of use of the embodiments of the present application.

As shown in FIG. 10, the electronic device 1000 is represented as a general-purpose computing device. Components of the electronic device 1000 may include, but are not limited to, at least one processing unit 1010, at least one storage unit 1020, a bus 1030 connecting different system components (including the storage unit 1020 and the processing unit 1010), a display unit 1040, etc.

The storage unit stores a program code, which may be executed by the processing unit 1010 to cause the processing unit 1010 to execute steps described in this specification in accordance with the various exemplary implementations of the present application. For example, the processing unit 1010 may execute the steps shown in FIG. 2, FIG. 4, and FIG. 6.

The storage unit 1020 may include a readable medium in a form of a volatile storage unit, such as a random access storage unit (RAM) 10201 and/or a high-speed cache storage unit 10202, and may further include a read-only storage unit (ROM) 10203.

The storage unit 1020 may also include a program/utility tool 10204 having a set (at least one) of program modules 10205, such program modules 10205 include but are not limited to: operating systems, one or more applications, other program modules, and program data, and each or some combinations of these examples may include an implementation of a network environment.

The bus 1030 may represent one or more of several classes of bus structures, including a storage unit bus or a storage unit controller, a peripheral bus, a graphics acceleration port, a processing unit, or a local bus using any of several classes of bus structures.

The electronic device 1000 may also communicate with one or more external devices 1000' (such as keyboards, pointing devices, Bluetooth devices, etc.), enabling a user to communicate with devices that interact with the electronic device 1000, and/or the electronic device 1000 may communicate with any device (such as a router, modem, etc.) that may communicate with one or more other computing devices. This communication may be performed through an input/output (I/O) interface 1050. In addition, the electronic device 1000 may also communicate with one or more networks (e.g. a local area network (LAN), a wide area network (WAN) and/or a public network e.g. Internet) via a network adapter 1060. The network adapter 1060 may communicate with other modules of the electronic device 1000 via the bus 1030. It should be understood that, although not shown in the figure, other hardware and/or software modules may be used in conjunction with the electronic device 1000, including but not limited to: a microcode, a device driver, a redundant processing unit, an external disk drive array, an RAID system, a tape drive, a data backup storage system, etc.

Figure 11:
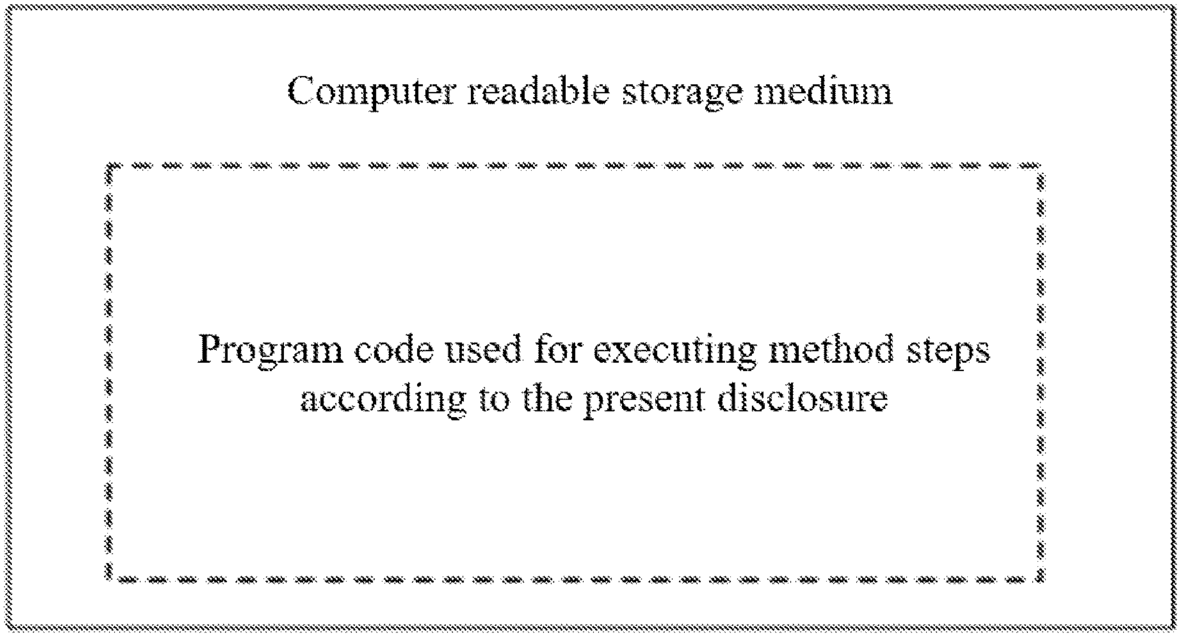
FIG. 11 is a block diagram of a computer readable medium shown by an embodiment of the present application.

The above description of the implementations is easy for those skilled in the art to understand, and the example implementations described herein may be implemented by software, or by software in combination with necessary hardware. Therefore, as shown in FIG. 11, the technical solution according to the implementations of the present application may be embodied in the form of a software product, the software product may be stored on a non-volatile storage medium (which may be a CD-ROM, a USB flash drive, a portable hard drive, etc.) or on a network, including a plurality of instructions to cause a computing device (which may be a personal computer, a server, or a network device, etc.) to execute the above method according to the implementations of the present application.

The software product may adopt any combination of one or more readable media. The readable medium may be a readable signal medium or a readable storage medium. For example, the readable storage medium for example, may be, but is not limited to electrical, magnetic, optical, electromagnetic, infrared, or semiconductor systems, apparatus or devices, or any combination of the above. More specific examples of the readable storage medium (a non-exhaustive list) include: an electrical connection having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer readable storage medium may include a data signal propagated in a baseband or as part of a carrier that carries a readable program code. Such transmitted data signals may take a plurality of forms, including but not limited to electromagnetic signals, optical signals, or any suitable combination of the above. The readable storage medium may also be any readable medium other than a readable storage medium, the readable medium may send, propagate or transmit a program intended for use by or in combination with an instruction executing system, apparatus or device. The program code contained on the readable storage medium may be transmitted in any appropriate medium, including but not limited to wireless, wired, fiber optic, RF, etc., or any suitable combination of the above.

The program code used to perform the operation of the present application may be written in any combination of one or more programming languages including object-oriented programming languages such as Java, C++, etc., as well as conventional procedural programming languages such as the "C" language or similar programming languages. The program code may be executed entirely on the user computing device, partly on the user computing device, as a stand-alone package, partly on the user computing device and partly on a remote computing device, or entirely on the remote computing device or server. In the case of the remote computing device, the remote computing device may be connected to the user computing device through any kind of network, including the local area network (LAN) or wide area network (WAN), or may be connected to an external computing device (e.g., using an Internet service provider to connect through the Internet).

The computer readable medium carries one or more programs. When one or more programs are executed by one device, the computer readable medium may achieve the following functions: the position offset information of the hoisting handle of the crane is acquired in real time; the displacement change rate is generated according to the position offset information when the position offset information meets the triggering condition; the displacement change rate is compared with the preset threshold to generate the stopping control instruction; and the overhead system of the device is controlled to perform deceleration stopping according to the stopping control instruction.

Those skilled in the art may understand that the above modules may be distributed in the apparatus as described in the embodiments or may be varied accordingly in one or more apparatuses uniquely different from this embodiment. The modules of the above embodiments may be combined into a single module or further divided into a plurality of sub-modules.

The above description of the embodiments is easy for those skilled in the art to understand, and the exemplary embodiments described herein may be implemented by software, or by software combined with necessary hardware. Therefore, the technical solution according to the embodiments of the present application may be embodied in the form of a software product, and the software product may be stored in a non-volatile storage medium (which may be a CD-ROM, a USB flash drive, a portable hard drive, etc.) or on a network, and includes a plurality of instructions to cause a computing device (which may be a personal computer, a server, a mobile terminal, or a network device, etc.) to execute the method according to the embodiments of the present application.

The exemplary embodiments of the present application are specifically shown and described above. It should be understood that the present application is not limited to a detailed structure, a set mode, or an implementation mode described herein; and instead, the present application is intended to cover various modifications and equivalent settings contained within the spirit and scope of the attached claims.

The invention claimed is:

1. A stopping method for a device with a hoisting mechanism, comprising:

acquiring position offset information of a hoisting handle in the hoisting mechanism of the device in real time;

calculating a displacement ratio of the hoisting handle through the position offset information;

triggering a precondition when the displacement ratio is greater than a displacement threshold, and triggering a deceleration stopping function in a case that the precondition is met and the displacement ratio is reduced to 0;

generating a displacement change rate according to the position offset information;

comparing the displacement change rate with a preset threshold to generate a stopping control instruction; and controlling an overhead system of the device to perform deceleration stopping according to the stopping control instruction.

2. The method according to claim 1, further comprising:

generating the preset threshold based on a relationship between motor torque characteristics of the device and a displacement change rate of the hoisting handle.

3. The method according to claim 2, wherein the preset threshold comprises a first threshold and a second threshold; and generating the preset threshold based on the relationship between the motor torque characteristics of the device and the displacement change rate of the hoisting handle comprises:

generating the first threshold according to a displacement change rate of a motor of the device following a speed of the hoisting handle under a normal state; and generating the second threshold according to the displacement change rate of the hoisting handle during automatic return.

4. The method according to claim 1, wherein acquiring the position offset information of the hoisting handle of the device in real time comprises:

acquiring the position offset information through a displacement sensor set on the hoisting handle of the device.

5. The method according to claim 4, wherein generating the displacement change rate according to the position offset information comprises:

acquiring a plurality of position offset information; and generating the displacement change rate according to the plurality of position offset information.

6. The method according to claim 5, wherein acquiring the plurality of position offset information comprises:

acquiring a plurality of frames of signals of the displacement sensor through a CAN to generate the plurality of position offset information.

7. The method according to claim 5, wherein generating the displacement change rate according to the plurality of position offset information comprises:

fitting the plurality of position offset information based on a least square method to generate the displacement change rate.

8. The method according to claim 3, wherein comparing the displacement change rate with the preset threshold to generate the stopping control instruction comprises:

generating a normal stopping control instruction in a case that the displacement change rate is less than or equal to the first threshold;

generating a handle throwing stopping control instruction in a case that the displacement change rate is greater than the first threshold and less than the second threshold; and generating a rapid stopping control instruction in a case that the displacement change rate is greater than or equal to the second threshold.

9. The method according to claim 8, wherein controlling the overhead system of the device to perform deceleration stopping according to the stopping control instruction comprises:

generating a target speed curve based on the position offset information under the normal stopping control instruction;

generating a target speed curve based on preset information under the handle throwing stopping control instruction;

generating a target speed curve based on a maximum motor deceleration capacity of the device under the rapid stopping control instruction; and controlling the device to perform stopping according to the target speed curve.

10. A stopping apparatus for a device with a hoisting mechanism, comprising:

a position module, configured to acquire position offset information of a hoisting handle in the hoisting mechanism of the device in real time;

a calculating module, configured to calculate a displacement ratio of the hoisting handle through the position offset information, trigger a precondition when the displacement ratio is greater than a displacement threshold, trigger a deceleration stopping function in a case that the precondition is met and the displacement ratio is reduced to 0, and generate a displacement change rate according to the position offset information;

an instruction module, configured to compare the displacement change rate with a preset threshold to generate a stopping control instruction; and a control module, configured to control an overhead system of the device to perform deceleration stopping according to the stopping control instruction.

11. The apparatus according to claim 10, further comprising:

a threshold module, configured to generate the preset threshold based on a relationship between motor torque characteristics of the device and a displacement change rate of the hoisting handle.

12. A crane, comprising:

an onboard controller, wherein the onboard controller implements the method according to claim 1.

13. The apparatus according to claim 11, wherein the preset threshold comprises the first threshold and the second threshold, and the threshold module is further configured to generate the first threshold based on the displacement change rate of the motor of the device following the speed of the hoisting handle under a normal condition, and generate the second threshold according to the displacement change rate of the hoisting handle during automatic return.

14. The apparatus according to claim 10, wherein the position module is further configured to acquire position offset information through a displacement sensor set on the hoisting handle of the device.

15. The apparatus according to claim 14, wherein the calculating module further comprises a rate unit, configured to acquire a plurality of position offset information, and generate the displacement change rate according to the plurality of position offset information.

16. The apparatus according to claim 15, wherein the rate unit is further configured to acquire a plurality of frames of signals of the displacement sensor through a CAN to generate the plurality of position offset information.

17. The apparatus according to claim 15, wherein the rate unit is further configured to fit the plurality of position offset information based on a least square method to generate the displacement change rate.

18. The apparatus according to claim 13, wherein the instruction module comprises:

a first instruction unit, configured to generate a normal stopping control instruction when the displacement change rate is less than or equal to a first threshold;

a second instruction unit, configured to generate a handle throwing stopping control instruction when the displacement change rate is greater than the first threshold and less than a second threshold; and a third instruction unit, configured to generate a rapid stopping control instruction when the displacement change rate is greater than or equal to the second threshold.

19. The apparatus according to claim 18, wherein the control module comprises:

a first speed unit, configured to generate a target speed curve based on the position offset information under the normal stopping control instruction;

a second speed unit, configured to generate a target speed curve based on the preset information under the handle throwing stopping control instruction;

a third speed unit, configured to generate a target speed curve based on a maximum motor deceleration capability of the device under the rapid stopping control instruction; and a control unit, configured to control the device to perform stopping according to the target speed curve.

* * * * *